United States Patent [19]
Chang

[11] Patent Number: 5,803,443
[45] Date of Patent: Sep. 8, 1998

[54] SHOCK ABSORBER FOR MOTOR VEHICLES

[76] Inventor: Wu-Sung Chang, No. 36, Lane 141, Chung San Rd., Sa Lu Chen, Taichung Hsien, Taiwan

[21] Appl. No.: 936,546

[22] Filed: Sep. 24, 1997

[51] Int. Cl.⁶ .................................................... B60G 1/00
[52] U.S. Cl. ............................................ 267/221; 267/177
[58] Field of Search ................................... 267/170, 177, 267/179, 221, 224, 286; 280/696, 701, 724

[56] References Cited

U.S. PATENT DOCUMENTS

| | | | |
|---|---|---|---|
| 5,044,614 | 9/1991 | Rau | 267/221 |
| 5,477,948 | 12/1995 | Stevens | 267/221 |
| 5,553,836 | 9/1996 | Ericson | 267/221 |
| 5,580,034 | 12/1996 | Cheng | 267/221 |

Primary Examiner—Robert J. Oberleitner
Assistant Examiner—Chris Schwartz
Attorney, Agent, or Firm—Varndell Legal Group

[57] ABSTRACT

A shock absorber including a fixed shaft, an adjustment shaft sleeved onto one end of the fixed shaft, an adjustment knob threaded onto the adjustment shaft, and a shock absorbing coil spring connected between the fixed shaft and the adjustment knob, wherein steel balls are moved in an annular groove on the adjustment knob around the adjustment shaft, and a cap is covered over the steel balls and having an upper Part retained between the inner diameter of the shock absorbing coil spring and the outer diameter of the adjustment shaft for permitting the shock absorbing coil spring to be compressed without being twisted when the adjustment knob is turned upwards.

1 Claim, 2 Drawing Sheets

SHOCK ABSORBER FOR MOTOR VEHICLES

BACKGROUND AND SUMMARY OF THE INVENTION

The present invention relates to a shock absorber for motor vehicles, and more particularly to such a shock absorber which the shock absorbing coil spring is supported on a cap above steel balls in an annular groove of the adjustment knob, so that the shock absorbing coil spring can be moved axially without being twisted when the adjustment knob is turned to adjust the spring force of the shock absorbing coil spring.

A regular shock absorber for a motorcycle is generally comprised of a fixed shaft fastened to the motorcycle frame, an adjustment shaft fastened to one wheel of the motorcycle and sleeved onto the bottom end of the fixed shaft, an adjustment knob threaded onto the adjustment shaft, and a shock absorbing coil spring connected between the top end of the fixed shaft and the adjustment knob. By means of turning the adjustment knob relative to the adjustment shaft, the spring force of the shock absorbing coil spring is relative adjusted. However, when the adjustment knob is turned upwards to compress the shock absorbing coil spring, the shock absorbing coil spring is simultaneously twisted. This structure of shock absorber is not satisfactory in function between frequently twisting the shock absorbing coil spring greatly shortens the service life of the shock absorbing coil spring.

The present invention has been accomplished to provide a shock absorber which eliminates the aforesaid problem. According to the present invention, an annular groove is made at the adjustment knob around its center screw hole, a plurality of steel balls are moved in the annular groove of the adjustment knob, and a cap is mounted in the annular groove of the adjustment knob and covered over the steel balls and having an upper part retained between the inner diameter of the shock absorbing coil spring and the outer diameter of the adjustment shaft for permitting the shock absorbing coil spring to be compressed without being twisted when the adjustment knob is turned upwards.

Figure 1:
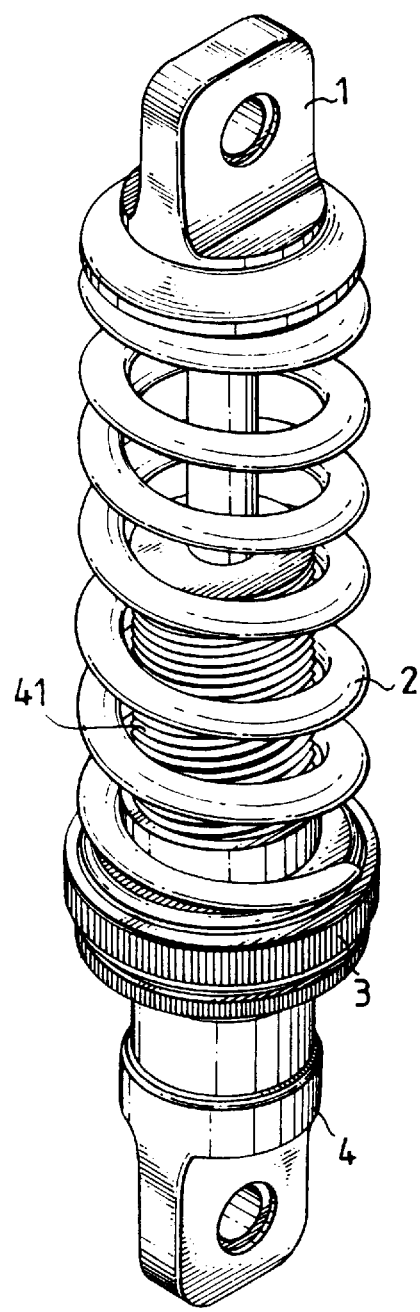
FIG. 1 is an elevational view of a shock absorber according to the present invention.

Figure is a cutaway of the shock absorber shown in FIG. 1.

DETAILED DESCRIPTION OF THE PREFERRED EMBODIMENT

Figure 2:
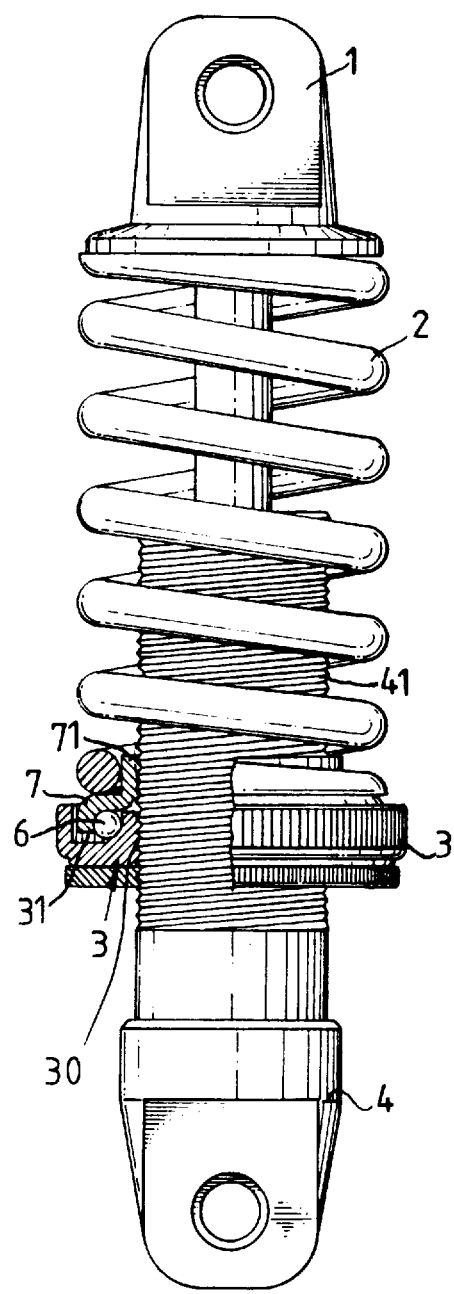

Referring to FIGS. 1 and 2, a shock absorber mounting structure in accordance with the present invention comprises generally a headed fixed shaft 1, a shock absorbing coil spring 2, an adjustment knob 3, and a headed adjustment shaft 4. The adjustment shaft 4 is a hollow shaft sleeved onto the bottom end of the fixed shaft 1 and moved axially relative to it, having an outer thread 41. The adjustment knob 3 has a center screw hole 30 threaded onto the outer thread 41 of the adjustment shaft 4. The shock absorbing coil spring 2 is mounted around the fixed shaft 1 and the adjustment shaft 4, having a top end connected to the head of the fixed shaft 1 and a bottom end supported on the adjustment knob 3. By means of adjusting the position of the adjustment knob 3 on the adjustment shaft 4, the spring force of the shock absorbing coil spring 2 is relatively adjusted.

Referring to FIGS. 1 and 2 again, the adjustment knob 3 comprises an annular groove 31 spaced around its center screw hole 30. A plurality of steel balls 6 are moved in the annular groove 31 of the adjustment knob 3. A cap 7 is mounted in the annular groove 31 of the adjustment knob 3 and covered over the steel balls 6, having an upper part 71 retianed between the inner diameter of the shock absorbing coil spring 2 and the outer thread 41 of the adjustment shaft 4. Because of the effect of the steel balls 31, the shock absorbing coil spring 2 is compressed without being twisted when the adjustment knob 3 upwardly turned about the adjustment shaft 4.

I claim:

1. A shock absorber comprising a fixed shaft, a hollow adjustment shaft sleeved onto said fixed shaft and moved axially relative thereto, said adjustment shaft having an outer thread, an adjustment knob having a center screw hole threaded onto the outer thread of said adjustment shaft, and a shock absorbing coil spring mounted around said fixed shaft and said adjustment shaft and having a top end connected to said fixed shaft outside said adjustment shaft and a bottom end supported on said adjustment knob, wherein said adjustment knob comprises an annular groove spaced around the center screw hole; a plurality of steel balls movability mounted in the annular groove of said adjustment knob; a cap mounted in the annular groove of said adjustment knob and covered over said steel balls, having an upper part retained between the inner diameter of said shock absorbing coil spring and the outer thread of said adjustment shaft.

* * * * *